Jan. 10, 1939.   L. OTTO   2,143,248
SEPTIC TOILET TANK
Filed April 8, 1937
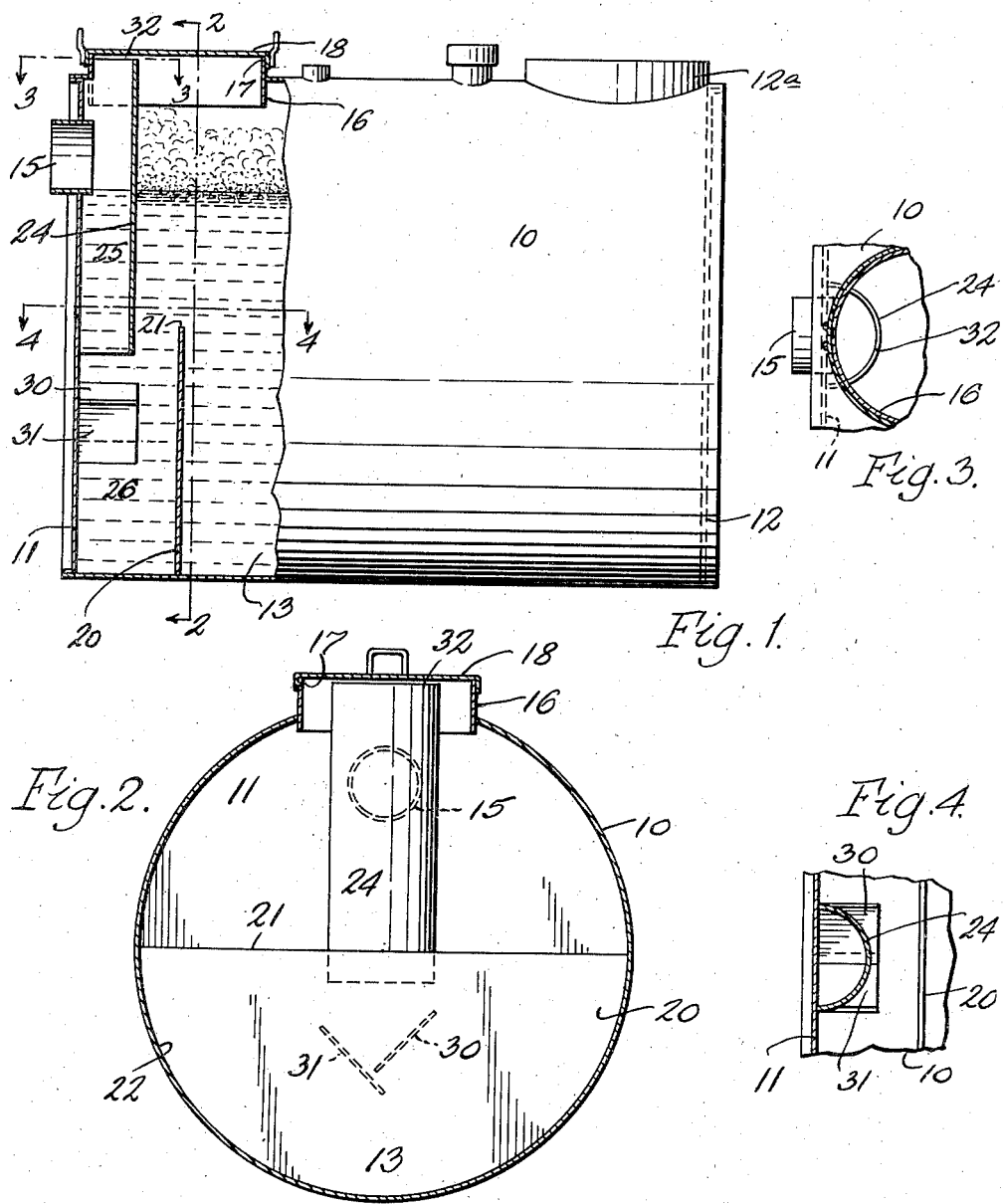
INVENTOR
Louis Otto
BY
Parker, Prochnow & Farmer
ATTORNEYS Patented Jan. 10, 1939

2,143,248

UNITED STATES PATENT OFFICE 2,143,248

SEPTIC TOILET TANK

Louis Otto, Perry, N. Y., assignor to Kaustine Company, Inc., Perry, N. Y.

Application April 8, 1937, Serial No. 135,679

4 Claims. (Cl. 210—6)

This invention relates to improvements in septic toilet tanks of that kind which are positioned beneath and are connected to the toilets in such a manner that sewage is received directly into 5 the tank.

In septic toilet tanks of this kind, the major portion of the tank is filled with liquid in which the sewage is deposited, and the disposal of the sewage is effected by decomposition as the re10 sult of fermentation or bacteriological action due to the presence of saphrophytic bacteria and plankton in the solution.

Under usual conditions, in a septic toilet tank which disposes of sewage in this manner, the 15 sewage forms a sludge in the lower part of the tank and the action of the bacteria causes the formation of a scum upon the surface of the liquid in the tank and on top of this scum there is usually present an accumulation of froth.

20 Tanks of this kind are usually provided with a horizontal outlet tube or member, the lower part of which determines the level of the liquid in the tank. This outlet member connects with a sewage pipe or drain tile through which the 25 excess liquid in the tank is discharged as additional liquid is introduced into the tank.

Various more or less effective means have heretofore been proposed for preventing the sludge in the bottom of the tank and the froth or scum 30 at the top of the tank from entering the overflow or discharge member since accumulations of such materials in the sewer pipe or drain tile soon cause the same to become clogged and thus interfere with the proper operation of the sew35 age system.

It is an object of this invention to construct a septic toilet tank having means of improved construction which will facilitate, in a greater degree than has heretofore been possible, the 40 prevention of sludge from passing from the lower part of the tank to the discharge connection of the tank and into the drain or sewer pipe.

Another object is to provide such a tank with improved means, which will in like degree, pre45 vent the passage of scum and froth from the top of the liquid into the tank outlet.

Various other objects and advantages of the present invention will be apparent from the embodiment of the invention herein disclosed and 50 its novel features will be pointed out in connection with the appended claims.

In the accompanying drawing:

Fig. 1 is a side elevation, partly in section, showing a septic toilet tank in which this in55 vention is embodied;

Fig. 2 is a transverse vertical section thereof, on line 2—2, Fig. 1;

Fig. 3 is a fragmentary, horizontal section thereof taken approximately on the line 3—3, Fig. 1;

Fig. 4 is a similar view, taken on the line 4—4, Fig. 1; and

Fig. 5 is a fragmentary perspective view of my improved means for preventing the entrance of sludge or sewage from passing into the tank outlet.

The invention is illustrated in the accompanying drawing in connection with a substantially cylindrical septic toilet tank having its axis disposed horizontally, but the invention is equally well adapted to tanks differently disposed or which are of different shape.

The tank shown comprises a substantially cylindrical, horizontally disposed shell or wall 10 having its opposite ends closed by end walls 11 and 12.

The tank is provided near the end wall 12 with a short upright sleeve 12a communicating with the interior of the tank and with which a toilet bowl, not shown, cooperates in a manner well known in this art for the deposit of sewage within the tank. By this arrangement the sewage is deposited in one end of the tank and moves in a lengthwise direction through the tank and accumulates largely in the form of sludge in the central portion 13 thereof, Fig. 1.

The tank also includes the usual discharge tube or outlet connection 15 at the end remote from the sleeve 12a and which is in the form of a horizontal sleeve secured as by welding it in a hole in the upper portion of the end wall 11, as shown in the drawing. The top portion of the tank at the end adjacent the discharge outlet 15 is provided with an upright sleeve or manhole 16 which projects a short distance downwardly into the tank and also a short distance upwardly out of the tank and terminates in a horizontal edge or margin 17 upon which rests a manhole cover or closure 18 which, when removed, permits access to the tank for cleaning.

A sludge baffle or wall 20 is disposed in the tank in a crosswise direction substantially parallel to and near the end wall 11 of the tank. This baffle 20 may be formed of a flat plate with a horizontal top edge 21 and a semi-circular edge 22 which engages and is secured to the cylindrical wall of the tank, as show clearly in Fig. 2. The upper edge 21 of this baffle or wall is disposed approximately half way between the top and the bottom of the tank and below the level of the liquid therein as determined by the outlet 15.

A second baffle is arranged between the end wall 11 and the baffle 20 in such a manner that it acts to divert sludge passing over the top edge of the baffle 20 from passing to the outlet 15 and this baffle also acts to hold back the scum and froth in the top part of the tank from entering the outlet 15. This baffle may be of any suitable construction and in the arrangement shown comprises a plate 24 which is arranged vertically and is bent into a substantially semi-cylindrical form and has its opposite upright edges secured to the end wall 11 in vertical planes at opposite sides of the outlet 15, as shown clearly in the drawings. The lower end of this baffle 24 preferably extends downwardly for some distance below and in spaced relation to the upper edge 21 of the sludge baffle 20. The baffle 24 thus forms an upright, open-ended passage connecting the lower part of the tank with the outlet 15.

The septic toilet tank as thus far described is of a construction well known in the art, and, except as hereinafter pointed out, forms no part of the invention.

In the use of the tank, particularly when substantial amounts of liquid are added thereto some disturbance of the sludge in the section 13 of the tank occurs which causes a resultant upward movement of sludge particles within the body of liquid and some of these particles due to resulting currents formed in the liquid in the tank are carried over the upper edge 21 of the baffle 20 into the space 26 between this baffle and the end wall 11 where, as the agitation in the tank subsides, they will settle to the bottom of this space.

However, upon subsequent agitation of the contents of the tank such as will cause currents and eddies therein, these relatively small deposits in the space 26 will again become disturbed, and such disturbance also takes place in a lesser degree as a result of the formation of gases which rise to the surface and tend to carry small particles of matter upwardly in the solution.

Under some conditions, some of this solid matter might be carried upwardly into the passage 25 between the baffle 24 and the end wall of the tank and find its way to the discharge outlet 15 and in order to prevent this occurrence or reduce such action to a minimum, I have provided novel means arranged in the tank below the baffle 24, which means are so constructed and disposed as to act to divert upwardly moving solid matter towards opposite sides of the curved baffle 24 so that their continued upward movement will be outside of the baffle and the entrance of such matter into the passage 25 is substantially prevented.

In the construction illustrated for this purpose, I provide two inclined metal plates 30 and 31, each of which is secured by one of its side edges to the end wall 11 so as to project inwardly therefrom, as clearly shown in the drawings. The inner inclined edges of the plates 30 and 31 are disposed in a vertical plane which is disposed slightly inwards beyond the baffle 24, see Fig. 4, and the lower horizontal edge of the plate 30 is spaced slightly above the lower horizontal edge of the plate 31 and in spaced relation to and over the plate 31. The upper edges of the two plates 30 and 31 are disposed approximately coincident with or slightly outwardly beyond the opposite upright edges of the baffle 24 at their connection with the wall 11.

By this arrangement, any particles of sludge or any gas which may be caused to move upwardly in the space 26 between the sludge baffle 20 and the end wall 11 as a result of any agitation in the tank will impinge against the under faces of the inclined plates and will be diverted or deflected thereby towards the sides of the tank beyond the baffle 24 and will thus be prevented from entering the passage 25 and the discharge outlet 15.

Furthermore, sludge particles which may be carried over the top edges of the sludge baffle 20 from the section 13 of the tank will pass largely between the baffle 20 and the inner edges of the plates 30 and 31 and will eventually settle at the bottom of the tank in the space 26. However, some of these particles may float into contact with the upper inclined faces of the plates 30 and 31, but since the plates are arranged in trough like formation with the bottom edge of the plate 30 in spaced relation to the plate 31, such particles will eventually pass downwardly off the plates through the opening between them and settle with the other accumulations in the bottom of the space 26.

In tanks of this kind, as heretofore constructed, it sometimes occurs that unusual quantities of froth and scum are formed in the top part of the tank and under such conditions some of this accumulated froth will find its way into the outlet 15 and eventually cause clogging of the drain pipes. However, in accordance with the present invention I have provided means for preventing the passage of scum and froth to the outlet 15. In the construction illustrated, I have accomplished this result by extending the baffle 24 upwardly to such an extent that its upper edge 32 is spaced only a slight distance below the bottom or inner face of the manhole cover 18, as shown clearly in Figs. 1 and 2.

As a result of this arrangement, it is possible for scum and froth to rise in the tank to the top thereof and clear into the manhole sleeve 17. Even under these conditions the froth will be prevented from passing over the baffle 24 into the discharge outlet 15 since the space between the top edge 32 of the baffle and the manhole cover is so narrow that the bubble like structure of which the froth is composed will be prevented from entering this space and passing into the outlet 15.

By means of the novel baffle arrangement composed of the plates 30 and 31 and the extension of the baffle 24 into the manhole sleeve close to the cover 18 the prevention of solids and gases as well as scum and froth from passing into the outlet 15 has been greatly increased and the action of the sewage system as a whole greatly improved as a result.

By leaving a slight space between the top of the baffle 24 and the cover 18, any free gases entering the lower end of the passage 25 can escape from the upper end of the passage.

The provision of the two baffle plates and the extension of the baffle 24 adds only a neglible increase to the cost of manufacture of septic toilet tanks, which is more than compensated for in the greatly improved results attained by their use.

I claim:

1. The combination in a septic toilet tank having a discharge opening in an upright wall thereof and in which the liquid level is determined by the lower edge of said opening, a baffle secured to said wall at opposite sides of said opening and forming therewith an upright passage open at its ends and communicating with said opening and terminating at its lower end in the liquid in spaced relation to the bottom of said tank, of a pair of oppositely disposed, upwardly and outwardly inclined plates secured to and projecting inwardly from said wall between the lower end of said baffle and the bottom of said tank, whereby sludge and gases rising from the bottom of said tank towards the lower end of said passage will impinge upon and be diverted by said plates away from said lower end of said passage, one of said plates having a substantially horizontal lower edge disposed over and in adjacent spaced relation to the other plate above and inwardly over the lower end thereof, whereby sludge settling upon the upper faces of said plates will find its way downwardly over and between said plates to the bottom of said tank.

2. In a septic toilet tank having a discharge opening in an upright wall thereof and in which the liquid level is determined by the lower edge of said opening, a baffle secured to said wall at opposite sides of said opening and forming therewith an upright passage open at its ends and communicating with said opening and terminating at its lower end in the liquid in spaced relation to the bottom of said tank, and said tank also having a sludge baffle disposed in the lower part of said tank near and in spaced relation to said wall and separating the space between said wall and said baffle from the other part of said tank, the combination therewith of opposite upwardly and outwardly inclined plates secured to and projecting laterally from said wall into said space between the lower end of said first baffle and the bottom of said tank and cross beyond the inner edge of said baffle, whereby sludge and gases rising from the bottom of said space towards the lower end of said passage will impinge upon and will be diverted by said plates away from the lower end of said passage, one of said plates having a substantially horizontal lower edge disposed over and in spaced adjacent relation to the other plate above and inwardly over the lower end thereof, whereby any sludge which, in passing over said sludge baffle into said space, settles upon the upper faces of said plates, will find its way downwardly over and between said plates to the bottom of said space.

3. In a septic toilet tank having a top wall, a manhole sleeve secured in and projecting above said top wall, a cover resting upon and closing the upper end of said sleeve, an upright wall having a discharge opening therein, the lower part of which determines the liquid level in said tank and which tank is of the type in which scum and froth is formed at the surface of the liquid therein, a baffle plate extending around said discharge opening and secured at its side edges to said upright wall and forming therewith an upright passage open at both ends and the lower end of which extends well below said opening into the liquid said plate having its upper end extended above the plane of said top wall and at a considerable distance above said discharge opening and into closely spaced relation to said manhole cover whereby scum and froth will be prevented from entering the top of said passage and passing into said discharge opening, and said manhole cover being removable to enable conditions within said manhole and about the upper discharge end of said upright passage to be readily inspected.

4. The combination, in a septic toilet tank having a discharge opening in an upright wall thereof and in which the liquid level is determined by the lower edge of said opening, said tank also having a top wall, of a baffle secured to said upright wall at opposite sides of said opening and forming therewith an upright passage open at its ends and communicating with said opening and terminating at its lower end in the liquid in spaced relation to the bottom of said tank, a pair of oppositely disposed, upwardly and outwardly inclined plates secured to and projecting inwardly from said upright wall between the lower end of said baffle and the bottom of said tank, whereby sludge and gases rising from the bottom of said tank towards the lower end of said passage will impinge upon and be diverted by said plates away from said lower end of said passage, one of said plates having a substantially horizontal lower edge disposed over and in spaced and adjacent relation to the other plate above and inwardly over the lower end thereof, whereby sludge settling upon the upper faces of said plates will find its way downwardly over and between said plates to the bottom of said tank, and said baffle having its upper end disposed in closely spaced relation to said top wall of said tank, so that scum and froth formed upon the surface of the liquid will be prevented from passing over said baffle and into said discharge opening.

LOUIS OTTO.